Jan. 12, 1943.　　　　T. BRAND　　　　2,307,984
APPARATUS FOR CLEANING POULTRY DROPPING BOARDS
Filed June 2, 1939　　　　2 Sheets-Sheet 1
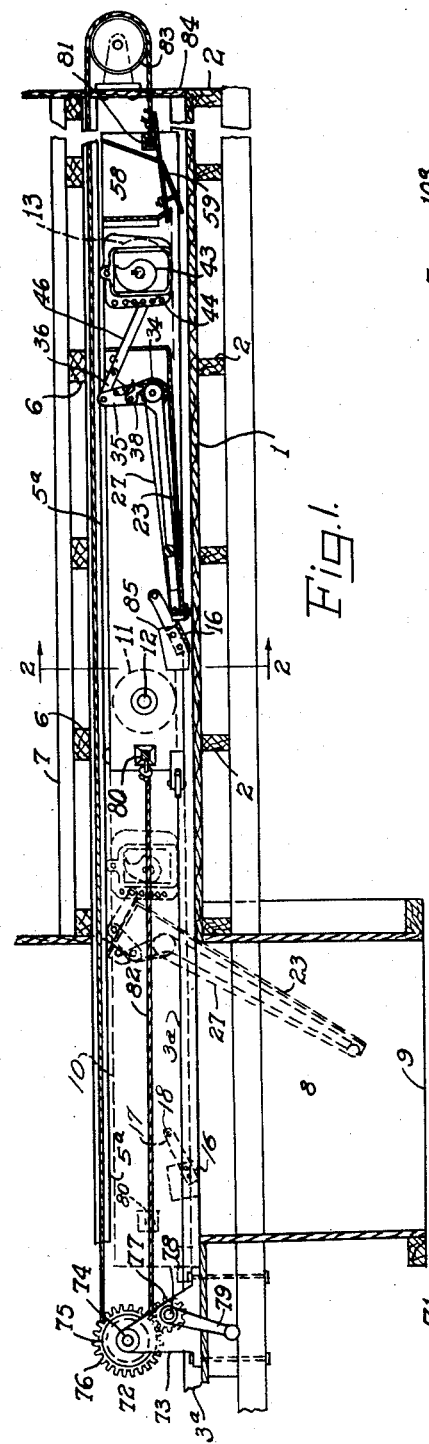
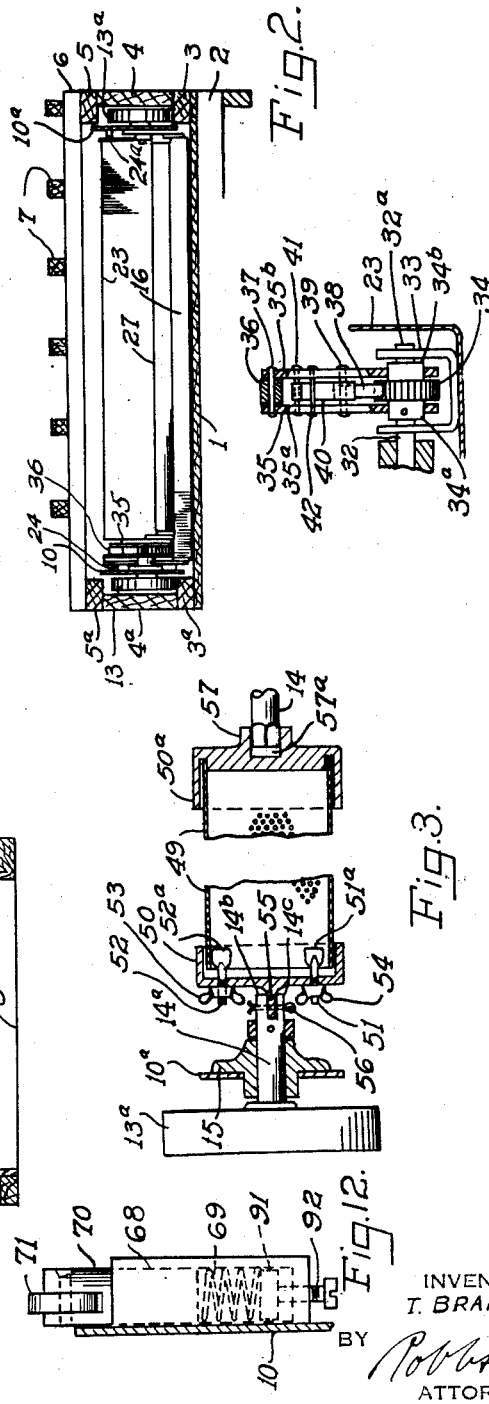
INVENTOR
T. BRAND.
BY
ATTORNEYS Jan. 12, 1943.　　　T. BRAND　　　2,307,984
APPARATUS FOR CLEANING POULTRY DROPPING BOARDS
Filed June 2, 1939　　2 Sheets-Sheet 2
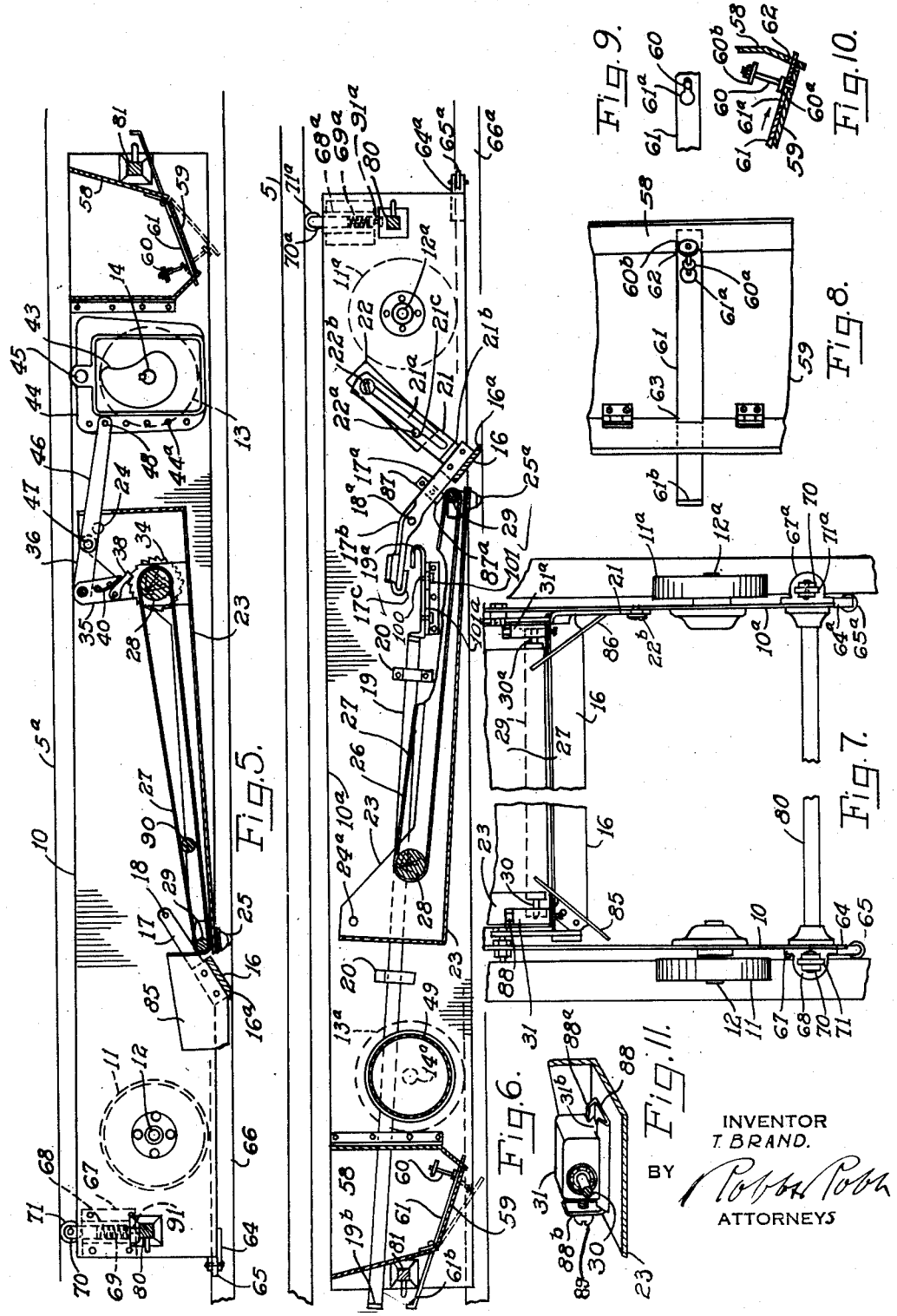
INVENTOR
T. BRAND.
BY
ATTORNEYS Patented Jan. 12, 1943

2,307,984

UNITED STATES PATENT OFFICE 2,307,984

APPARATUS FOR CLEANING POULTRY DROPPING BOARDS

Theodore Brand, Dayton, Ohio

Application June 2, 1939, Serial No. 277,116

17 Claims. (Cl. 119—22)

This invention relates to the problem of maintaining sanitary conditions in poultry houses, and more particularly to the provision of means for removing the excrement or poultry droppings from the platform or floor beneath the roosts in such poultry houses.

It is a principal object of the invention to provide a scraping device for the above purpose, which is simple in construction, and highly effective in operation, and which may be operated either by hand or power means for quickly and effectively performing the function of cleaning dropping boards under the poultry roosts.

A further object of the invention is to provide means of the type above described, in which provision is made for locking the scraping means of the device in a raised non-operative position during travel of the said device in one direction and for automatically positioning the scraping means in operative position when the device has reached the limit of its movement in one direction.

Another object of the invention is the provision of endless conveyer means for receiving the excrement deposited thereon by the scraper instrumentalities, which said conveyer means has associated therewith instrumentalities for imparting predetermined limited movement to said conveyer means coordinated with the length of the particular dropping board being cleaned.

A still further object of the invention is the provision of receiving instrumentalities for deposit of the excrement removed thereupon, which said instrumentalities may be caused to dump their contents automatically when the operation is completed.

Another object of the invention is to provide a dispensing receptacle cooperative with the driving instrumentalities to deposit predetermined amounts of sterilizing chemicals upon the dropping board after the same has been cleaned by the scraper means.

Another object of the invention is the provision of distributing instrumentalities automatically operative pursuant upon positioning of the scraper instrumentalities in operative position, to place said distributing instrumentalities in condition for deposit of a layer of sawdust, or other similar material, upon the portion of the dropping board cleaned, after the scraping instrumentalities have performed their operation thereupon.

A still further object of the invention is the provision of means for automatically predetermining the thickness of the layer of sawdust, or any other such material, to be deposited by the distributing instrumentalities.

Other objects, advantages, and features of novelty will appear more fully as the description of the invention progresses, in conjunction with the drawings, in which:

Figure 1 is a vertical sectional view through a portion of a chicken house, illustrating an embodiment of the present invention in its relation thereto.

Figure 2 is a transverse vertical sectional view taken on the line 2—2 of Figure 1, looking in the direction of the arrows.

Figure 3 is a transverse vertical sectional view of a portion of the device illustrated in Figure 1, showing more particularly the dispensing instrumentalities for depositing chemicals upon the dropping board and their operative relation with the driving instrumentalities of the device.

Figure 4 is a detail of the pawl and ratchet means associated with the conveyer instrumentalities, certain portions being shown in section.

Figure 5 is a vertical sectional view through the device illustrated in Figure 1, taken longitudinally substantially through the center of said device looking toward one side thereof.

Figure 6 is a view similar to Figure 5 but looking toward the opposite side of said device.

Figure 7 is a plan view of the front end of the device illustrated in Figure 1, showing the scraper instrumentalities and a portion of the conveyer.

Figure 8 is a top view of the distributing means.

Figure 9 is a bottom view of the latch member for the distributing means.

Figure 10 is a vertical sectional view of a portion of the distributing instrumentalities showing more particularly the latch means and provision for predetermining the thickness of the layer of material deposited.

Figure 11 is a perspective view of a portion of the conveyer instrumentalities showing more particularly the means for adjusting the same.

Figure 12 is an end view of one of the spring-pressed roller engaging members.

Referring now to the drawings for a detailed description of the invention, and more particularly at the present to Figures 1 and 2, the floor or platform positioned beneath the poultry roosts is indicated by the numeral 1, the same being supported by transverse supports indicated at 2. Longitudinal track members 3 and 3a extending the length of the floor or dropping board 1 and supported thereupon are provided as shown more particularly in Figure 2, and the numerals 4 and 4a indicate side guide walls supported on the track members 3 and 3a respectively, and running longitudinally thereof to guide the movement of the scraper device along the length of its travel. At the top of each of the side walls 4 and 4a, there are provided guide rails 5 and 5a, supported by said side walls, and extending longitudinally thereof and inwardly therefrom to substantially the same extent as the track members 3 and 3a.

Upon transverse supports 6 resting on the upper rail guide members 5 and 5a are secured a plurality of roosts 7 extending the length of the dropping board or floor 1.

At one end of the dropping board or floor 1 there is provided a fertilizer pit 8, the bottom or floor 9 of which is at some distance below the level of the dropping board 1.

The movable instrumentalities of the invention comprise a carriage consisting of side longitudinal frame members 10 and 10a and transverse frame members 80 and 81 extending therebetween at the front and rear. To the frame members 10 and 10a are respectively secured the front supporting wheels 11 and 11a by means of stub shafts 12 and 12a associated therewith. Rear driving wheels 13 and 13a are provided, the same being keyed to stub shafts 14 and 14a respectively journaled in bearing members 15 secured to the respective side members 10 and 10a.

The scraper instrumentalities, seen best in Figures 5 and 6, comprise a scraper blade 16 having a beveled edge 16a supported at either side by the supporting arms 17 and 17a rigidly secured to said blade 16 and pivoted as at 18 and 18a to the side members 10 and 10a respectively. Guide plates 85 and 86 are secured to the upper surface of the scraper 16 at either side thereof for directing material removed by said scraper toward the conveyer instrumentalities to be described hereinafter. A bracket 87 secured to the side member 10a has an angle portion 87a which engages the under surface of the arm 17a for limiting the downward movement of the arm when the scraper is lowered to operative scraping position.

The upper portion of the arm 17a is somewhat curved as at 17b and is provided with a hook portion 17c for interconnection with a hook portion 19a of the rod or kick-off bar 19 supported upon and movable longitudinally relative to the side member 10a by means of brackets 20. The right end of the kick-off bar 19, referring to Figure 6, is provided with bolts 100 which extend through elongated slots 101a, provided in an angle bracket 101, secured to the side member 10a of the carriage, whereby the said end of the kick-off bar is supported by the angle plate 101 for sliding movement relative thereto. Positioned for cooperation with the scraper 16 is a lock plate 21 having a longitudinal slot 21a for cooperation with studs 22a and 22b offstanding from a bracket 22 secured to the side frame member 10a, the stud 22b having a head of larger diameter than the width of the slot. The studs 22a and 22b support said bracket slidably respecting said frame member 10a. The angle portion 21b of the lock plate 21 engages the scraper 16 and the lock plate is consequently slidingly moved respecting the studs 22a and 22b as the scraper is raised and lowered by movement of the lever arm 17a about its pivot 18a. The lock plate 21 is provided with a notch 21c extending from the slot 21b.

The blade 16 is positioned for scraping operation by engagement of the stud 22a in the notch 21c of lock plate 21, this interconnection serving to prevent the blade 16 from buckling upward upon meeting any obstruction during its passage over the dropping board 1. Engagement of the portion 87a of the bracket 87 with the arm 17a prevents scraper 16 from digging into the board.

When lock plate 21 is released from locking cooperation of the stud 22a with the notch 21c, the scraper 16 may be raised by exerting a downward pressure upon the upper end of the lever 17a to position the hook portion 17c for engagement with the hook portion 19a of the bar 19. Movement of the bar 19 in a leftward direction, having reference to Figure 6, will effect inter-engagement of the hook portions 17c and 19a so that the blade 16 will be locked in raised position during movement of the device rearwardly or in a leftward direction respecting Figure 6.

This is desirable because when the carriage is to be returned to one end of the dropping board 1 for commencement of the scraping operation, the scraper blade should preferably be maintained in a position above the level of the excrement on the dropping board 1 so that said blade does not cause said excrement to be spread out or mashed into the dropping board by contact of the under surface of the blade therewith.

A metal pan 23 pivoted at either side as at 24 and 24a to the side frame members 10 and 10a is provided at its free end with rolling supporting means comprising preferably roller bearings 25 and 25a secured in any suitable manner to the under side of said pan 23.

Conveyor instrumentalities, generally designated at 26, are carried by the pan 23 and the same comprise an endless belt or web 27 trained over roller shafts 28 and 29, extending transversely of the carriage, the shaft 29 being provided with reduced shaft ends 30 and 30a journaled in suitable adjustable slide blocks 31 and 31a respectively secured at opposite sides of the pan 23. The roller shaft 28 is similarly provided at opposite ends with reduced shaft ends 32 journaled in suitable brackets provided at opposite sides of the pan 23.

The slide blocks 31 and 31a are provided with tongue portions 31b which cooperate with the inclined walls 88a of a channel bracket 88 secured to pan 23 providing a slidable dove-tail connection between block and bracket. The end walls 88b of bracket 88 are provided with adjusting screws 89 engaging the blocks to enable tightening of the conveyor belt 27.

A roller 90 journaled in suitable brackets secured at opposite sides of the pan 23 intermediate the rollers 28 and 29 provides additional support for the belt 27.

The bracket, supporting the roller 28 at one side of the pan 23, is preferably in the form of a U-bracket 33, between the opposite sides of which bracket is positioned a ratchet gear 34 having a hub portion 34a, said gear being keyed to the portion 32a of the shaft end 32 extending between the sides of the U-bracket 33.

An arm 35, comprising spaced interconnected members 35a and 35b journaled on the hub portions 34a and 34b respectively, has pivotally secured at its upper end, between the spaced members 35a and 35b, a link 36 by means of a pivot pin 37 extending between said spaced members 35a and 35b. A pawl 38 for engagement with the ratchet gear 34 is carried between the spaced members 35a and 35b by means of a pivot pin 39 extending through said members.

A spring element 40, comprising in the present instance a strip of spring metal, is also secured between the spaced members 35a and 35b to a pin 41 extending therethrough and is pressed into engagement with the pawl 38 by means of a second pin 42 extending through said members 35a and 35b for maintaining the pawl 38 in position for engagement with the teeth of the ratchet gear 34.

The conveyer instrumentalities including the supporting pan 23, the conveyer itself, and the pawl and ratchet mechanism, comprise a unit which is pivotal about the pivot points 24 and 24a whereby to permit said instrumentalities to drop vertically to a dumping position when the carriage reaches that end of the dropping board 1 at which the fertilizer pit 8 is positioned.

Keyed to the shaft 14 of the rear carriage supporting wheel 13 is a cam 43 cooperating with the cam follower 44 pivotally secured to the side frame member 10 by a pivot 45. A link 46, pivotally secured to the link 36, as at 47, is also pivotally secured by means of a pivot pin 48 cooperating with one of several openings 44a, in the cam follower 44, the particular one of such openings selected for the pivot connection of the link 46 to the said cam follower being determined by the extent of throw desired to be imparted to the arm 35 through the links 36 and 46. The parts 36 and 46 are preferably so connected that the pivot 47 will not fall below a straight line between said parts.

Extending between the stub shafts 14 and 14a of the rear carriage wheels 13 and 13a, and adapted to be operated by rotation of one or the other of said wheels, is a lime dispenser now to be described. This lime dispenser comprises a cylindrical screen 49 secured at opposite ends to circular head members 50 and 50a. The means for securing the head or cap 50 to the screen 49 comprises bolts 51 and 52 extending through holes in the said head 50 and flattened at their inner ends, as at 51a and 52a, the flattened ends of said bolts being secured to the adjacent end of said screen, as by soldering the same thereto or by any suitable means. The outer ends of said bolts are threaded for cooperation with wing nuts 53 and 54 respectively whereby the cap 50 may be removably secured to the cylindrical screen.

The cap 50 has a hub extension 55 which is secured between the bifurcated ends 14b and 14c of the shaft 14a by means of a cotter key 56 extending therethrough. The head member 50a comprises a hub portion 57 having a square socket 57a cooperating with the square end of stub shaft 14.

Secured between the side frame members 10 and 10a, at the rear of the carriage, is a distributing hopper 58 having a hinged bottom opening door 59. Upstanding from the door 59 is a stud bolt 60 extending through the key-hole slot 61a of a slidable latch bar 61 extending through openings 62 and 63 in opposite sides of the hopper 58.

The stud bolt 60 is provided with a collar 60a of such a size that it cannot pass through the narrow portion of the keyhole slot 61a but it may pass through the large portion of said slot. The stud bolt 60 is also provided with a nut 60b, cooperating with the upper threaded portion of said bolt, which nut is of a size sufficiently large that it cannot pass through the key-hole opening 61a.

When the hopper door is in closed position, the latch bar 61 may be moved to the position shown in Figures 9 and 10, at which time the narrow portion of the key-hole slot 61a will receive the stud bolt 60 and the door 59 will be locked in closed position by engagement of the collar 60a with the upper side of said lock bar 61. When the latch bolt 61 is moved in the direction of the arrow, indicated at Figure 10, the wider portion of the key-hole slot 61a will be moved adjacent the stud bolt 60, permitting the collar 60a to drop through the said key-hole slot thereby opening the door 59 to an extent determined by the position of the adjustable nut 60b which engages the upper surface of the lock bar to limit the opening movement of the door 59 when the lock bar 61 is moved as indicated.

At the forward ends of the frame members 10 and 10a are secured brackets 64 and 64a carrying roller members 65 and 65a respectively engaging the inner vertical faces 66 and 66a of the lower rails or tracks 3 and 3a respectively. The purpose of the roller members 65 and 65a is to guide the carriage in its travel along the length of the dropping board.

Secured to the forward ends of the side frame members 10 and 10a are bracket members 67 and 67a, comprising socket portions 68 and 68a, in which are seated coil springs 69 and 69a, the upper ends of which bear against the bifurcated arms 70 and 70a between the bifurcated portions of which are rotatably secured roller members 71 and 71a which bear against the upper track members 5 and 5a. The lower ends of said springs 69 and 69a seat upon abutment members 91 and 91a secured to adjusting screws 92 and 92a extending through the bases of the sockets 68 and 68a enabling adjustment of the spring pressure of rollers 71 and 71a against upper rails 5 and 5a.

The guide roller means, just described, is resiliently maintained pressed against said upper track members by the action of the coil springs 69 and 69a and said devices serve to guide the carriage in its movement along the dropping board and maintain said carriage properly positioned upon the track.

Any suitable power means may, of course, be employed for causing movement of the carriage along the length of the dropping board 1. In the embodiment of the invention shown, a winch is employed as the motive power. As shown in Figure 1, the winch, generally indicated by the number 72, is positioned at one side of the manure pit 8 farthest from the dropping board 1 and comprises spaced side supporting members 73 in which are journaled opposing shaft ends 74 of a drum 75.

Fixed to one of the shaft ends 74 is a gear 76 meshing with a second gear 77 mounted upon a shaft 78, opposing ends of which latter shaft are journaled in the spaced side supporting members 73. Fixed to the shaft 78 is a crank 79 for manual operation of the winch or windless device.

Suitably connected to the mid portion of the transverse frame member 80 is a cable 82 trained around the drum 75, thence extending rearwardly the length of the dropping board 1, above the carriage and passing about a pulley 83 rotatably mounted in any convenient manner adjacent the rear end of the dropping board, thence extending to the rear end of the carriage where the free end of said cable is connected thereto at a mid point of the transverse frame member 81.

*Operation*

Assuming the scraper 16 to be positioned in its downward operative scraping position in contact with the dropping board 1 and that it is desired now to return the carriage to the rear or right end of the dropping board, having reference to Figure 1, the slidable latch plate 21 will be disengaged from interlocking cooperation of the notch 21c with the stud 22a to permit raising of the scraper 16 by movement of the lever 17a about its pivot 18a in a counterclockwise direction, having reference to Figure 6. This will position the hook portion 17c of said lever for interlocking engagement with the hook portion 19a of the kick-off bar 19, which interlocking engagement is effected by movement of said kickoff bar 19 in a rearward or leftward direction, having reference to Figure 6. The scraper 16 is thereby maintained in inoperative position out of engagement with the dropping board 1.

The hopper door 59 will be closed and locked in closed position by movement of the lock bar 61 in a leftward direction, having reference to Figure 6, in which position the narrow end of the key-hole slot 61a will engage the stud bolt 60, the collar 60a at such time engaging the upper surface of the lock bar to maintain the door 59 in closed position.

The crank 79 may now be actuated to rotate the same in a clockwise direction, having reference to Figure 1, causing the drum 75 to be rotated in a counterclockwise direction, to effect movement of the carriage toward the right end of the dropping board, having reference to Figure 1. As the carriage approaches the limit of its rightward movement on the dropping board 1, having reference to Figure 1, the extreme ends 19b and 61b of the bar 19 and the lock bar 61 respectively will engage the end wall 84 causing the kick-off bar 19 and the latch bar 61 to be moved rightwardly, having reference to Figure 6.

Under such conditions, movement of the kick-off bar 19 in a rightward direction will cause disengagement of the hook portions 19a and 17c permitting the scraper 16 to drop by gravity into a position of contact with the dropping board 1. Concurrently with such positioning of the scraper 16, the latch plate 21 will slide downwardly, respecting the studs 22a and 22b, into a position in which angle portion 21b of the lock plate engages the upper face of the scraper 16 at which time the stud 22a will have become engaged in the notch 21c. The scraper 16 is thus maintained positively locked downwardly in scraping position, to prevent the same from buckling or rising upwardly upon meeting any obstruction during movement of the carriage in the direction of the manure pit 8. Bracket 87 engaging arm 17a prevents scraper 16 from digging into the dropping board 1.

Movement of the latch bar 61 in a rightward direction having reference to Figure 6, upon engagement of the same with the end wall 84, will cause the wider portion of the key-hole slot 61a to be moved adjacent the stud bolt 60, permitting the collar 60a to drop through said key-hole slot thereby opening by gravity the hopper door 59. The extent of opening of the hopper door 59 will, of course, be determined by the position of the adjustable nut 60b, which may be adjusted respecting the length of the stud bolt 60, to permit a greater to less degree of opening of the hopper door 59, since said adjusting nut 60b cannot pass through the key-hole slot 61a.

Now the carriage may be caused to move in leftward direction, respecting Figure 1, by actuation of the crank 79 to rotate the same in a counterclockwise direction. As the carriage moves in the direction of the manure pit 8, the scraper 16 will scrape the poultry excrement from the dropping board 1, plowing under the same in the scraping operation and causing said excrement to be piled up in front of and upon the upper surface of the blade 16, the guide plates 85 and 86 directing the scraped material toward the conveyer instrumentalities 26. Thus, as the carriage moves toward the manure pit 8, the poultry excrement will be caused to be deposited upon the upper surface of the conveyer 27.

During movement of the carriage along the dropping board in the direction of the manure pit 8, the rear supporting wheel 13 will be caused to rotate in a counterclockwise direction, having reference to Figures 1 and 5, causing the cam 43 accordingly to rotate in the same direction effecting pendulous swinging of the cam follower 44 about its pivot 45. The pendulous swinging of the cam follower 44 effects reciprocatory movement of the links 36 and 46 which, in turn, causes corresponding movement of the arm 35.

Rearward movement of the arm 35 causes effective engagement of the pawl 38 with the ratchet 34 resulting in clockwise movement of the roller shaft 28 and consequent rightward movement of the conveyer 27. During leftward movement of the arm 35 effective engagement of the pawl 38 with the ratchet 34 is temporarily suspended until the arm 35 reaches the limit of its stroke or throw in that direction, whereupon effective engagement of the pawl and ratchet is re-established, again causing movement of the conveyer 27.

A step by step movement of the conveyer is thus effected to carry excrement deposited on the forward end thereof gradually toward the rear of the same. The connection of the link 46 with the cam follower 44 is preferably so arranged by selection of the particular opening 44a cooperating with the pivot pin 48 as to cause a pre-determined movement of the conveyer 27 during the progress of the carriage along the length of the dropping board 1. The pre-determined movement of the conveyer is preferably such that the excrement deposited upon the forward end thereof will be carried rearwardly to a point just forward of the rear end of the conveyer or just forward of the roller shaft 28 by the time that the scraper 16 reaches the end of the dropping board adjacent the manure pit 8.

The pan 23 being pivotally supported respecting the carriage side frame members 10 and 10a at the points 24 and 24a only, and said pan providing the sole support for the conveyer instrumentalities, said pan and conveyer instrumentalities will gradually assume the dotted line position indicated in Figure 1 as the carriage approaches the limit of its movement in the direction of the manure pit 8.

The pivotal connection of the links 36 and 46, at 47, being forward of the pivotal connections 24 and 25 of the pan 23 with the carriage, permits movement of the link 36 and arm 35, and of the pan 23 and conveyer instrumentalities 26, to the dotted line position shown in Figure 1 without breaking the connection between the links 36 and 46.

During movement of the conveyer instrumentalities 26 to effect assumption of the dotted line position thereof, indicated in Figure 1, the material which has been deposited thereupon during progress of the carriage toward the manure pit 8 will at such time be dumped into said manure pit.

As the carriage progresses in the direction of the manure pit 8, the cylindrical screen 49 will be caused to rotate through cooperation of the rear carriage wheel 13a therewith to cause powdered lime contained within said cylindrical screen 49 to be deposited upon that portion of the dropping board which has just recently been cleaned by operation of the scraper thereover. Also during movement of the carriage in the direction of the manure pit 8, sawdust or other similar material contained within the hopper 58 will be caused to be deposited upon the cleaned portion of the dropping board in a layer, the thickness of which is determined by the extent of opening of the hopper door 59.

From the foregoing description, it will be seen that the present invention provides efficient cleaning instrumentalities for removing poultry excrement from the dropping board and means for conveying it to the manure pit together with a conveyer means operable for pre-determined movement as the scraper performs its cleaning operation, and means operable conjointly with the movement of the scraper for effecting sterilization and sanitation of the poultry house dropping board as the same is being cleaned.

Having thus described my invention, what I claim as new and desire to secure by Letters Patent of the United States is:

1. In apparatus for cleaning poultry dropping boards, in combination, a carriage, a scraper movable relative thereto for engaging and cleaning a dropping board, operating cable and drum devices for moving the scraper in opposite directions along the surface of the board, a member on the carriage longitudinally movable relative thereto and interlockingly engageable with the scraper when the latter is upraised to maintain the scraper upraised from the board when moving in one direction, and automatic means for releasing effective action of said member to permit engagement of the scraper with the board when moving in an opposite direction for effective cleaning action, the last means comprising a kick-off bar associated with said member.

2. In apparatus for cleaning poultry dropping boards, in combination, a scraper for engaging and cleaning a dropping board, a carriage for said scraper, supporting wheels on said carriage, means for moving the scraper in opposite directions along the surface of the board, instrumentalities to maintain the scraper upraised from the board when moving in one direction, means for causing engagement of the scraper with the board when moving in an opposite direction for effective cleaning action, a lime dispensing receptacle on said carriage at the rear thereof and connected for actuation by one of said wheels while the scraper is performing its effective cleaning of the dropping board, and a saw-dust dispenser connected to move with said scraper, and means coordinated with said second means to condition the saw-dust dispenser for the dispensing operation concurrently with initiation of operation of said second means.

3. In apparatus for cleaning poultry dropping boards, in combination, a scraper for engaging and cleaning a dropping board, means for moving the scraper in opposite directions along the surface of the board, instrumentalities to maintain the scraper upraised from the board when moving in one direction, means for causing engagement of the scraper with the board when moving in an opposite direction for effective cleaning action, a saw-dust dispensing receptacle connected to move with the scraper at the rear thereof while the scraper is performing its effective cleaning of the dropping board, and means coordinated with said second means to condition the saw-dust dispenser for the dispensing operation concurrently with initiation of operation of said second means.

4. In apparatus for cleaning poultry dropping boards, in combination, a dropping board, a scraper for engaging and cleaning said board, means for moving the scraper in opposite directions along the surface of the board, instrumentalities to maintain the scraper upraised from the board when moving in one direction, and means for causing engagement of the scraper with the board when moving in an opposite direction for effective cleaning action, a pit at an end of the dropping board, a conveyer to receive droppings scraped up by the scraper and movable with the latter, means supporting the conveyer, and a movable connection between the conveyer and the support therefor permitting the conveyer to drop into the pit to discharge the droppings received thereon.

5. In apparatus for cleaning poultry dropping boards, in combination, a scraper for engaging and cleaning a dropping board, a carriage for the scraper, means for moving the scraper in opposite directions along the surface of the board, instrumentalities to maintain the scraper upraised from the board when moving in one direction, and means for causing engagement of the scraper with the board when moving in an opposite direction for effective cleaning action, a receptacle to receive droppings scraped up by the scraper and movable with the latter, and a pivotal connection between the receptacle and the carriage, whereby the receptacle is partially supported by the carriage and partially supported by the surface over which the carriage travels.

6. In apparatus for cleaning poultry dropping boards, in combination, a scraper for engaging and cleaning a dropping board, means for moving the scraper in opposite directions along the surface of the board, instrumentalities to maintain the scraper upraised from the board when moving in one direction, means for causing engagement of the scraper with the board when moving in an opposite direction for effective cleaning action, a saw-dust dispensing receptacle connected to move with the scraper at the rear thereof while the scraper is performing its effective cleaning of the dropping board, and automatic means for opening the saw-dust receptacle when the scraper reaches the end of its movement in the direction opposite its direction of cleaning movement.

7. In apparatus for cleaning poultry dropping boards, in combination, a scraper for engaging and cleaning a dropping board, a carriage for the scraper, supporting wheels for said carriage, means for moving the scraper in opposite directions along the surface of the board, instrumentalities to maintain the scraper upraised from the board when moving in one direction, means for causing engagement of the scraper with the board when moving in an opposite direction for effective cleaning action, a conveyer to receive droppings scraped up by the scraper and movable with the latter, a pivotal connection between the conveyer and the carriage, whereby the conveyer is partially supported by the carriage and partially supported by the surface over which the carriage travels, and means interconnecting said conveyer with one of said wheels to effect automatic step by step movement of said conveyer.

8. In apparatus for cleaning poultry dropping boards, in combination, a carriage, a scraper carried by and movable relative to said carriage for engaging and cleaning a dropping board, means for moving the carriage in opposite directions along the surface of the board, instrumentalities to maintain the scraper upraised from the board when moving in one direction, said instrumentalities comprising a part associated with the scraper and a part on the carriage movable relative thereto, said parts having hook portions interlockingly engageable when the scraper is upraised, and means operable upon said instrumentalities for automatically releasing the scraper from effective action of said instrumentalities to permit engagement of the scraper with the board when the scraper reaches a predetermined point in its movement over the board.

9. In apparatus for cleaning poultry dropping boards, in combination, a carriage, a scraper carried by and movable relative to the carriage into and out of engagement with a dropping board, means for moving the carriage in opposite directions along the surface of the board, a member on the carriage movable relative thereto and interlockingly engageable with the scraper when the latter is moved to a position out of engagement with the board to maintain the scraper in said position, and automatic means for releasing the scraper from effective action of said member to permit engagement of the scraper with the board when the carriage reaches a pre-determined point in its movement over the board.

10. In apparatus for cleaning poultry dropping boards, in combination, a carriage, a scraper movable relative to said carriage into and out of engagement with said board, means for moving the carriage in opposite directions along the surface of the board, instrumentalities for maintaining the scraper up-raised from the board when the carriage is moving in one direction, and means for positively maintaining the scraper in engagement with the board when the carriage is moving in an opposite direction for effective cleaning action, said last means comprising an instrumentality releasable for downward movement by gravity upon release of the scraper from effective action of said instrumentalities, and means automatically cooperable with said instrumentality upon downward movement thereof to lock the same relative to the scraper when the latter is in dropping board engaging position.

11. In apparatus for cleaning poultry dropping boards, in combination, a carriage, a scraper movable relative to said carriage into and out of engagement with said board, means for moving the carriage in opposite directions along the surface of the board, instrumentalities for maintaining the scraper up-raised from the board when the carriage is moving in one direction, means for positively maintaining the scraper in engagement with the board when the carriage is moving in an opposite direction for effective cleaning action, and automatic means for releasing the scraper from effective action of said instrumentalities and for releasing for effective action of the means for maintaining the scraper engaged with the board when the carriage reaches a pre-determined point in its movement over the board.

12. In apparatus for cleaning poultry dropping boards, in combination, a carriage, a scraper pivoted to said carriage for movement into and out of engagement with a dropping board, means for moving the carriage in opposite directions along the surface of the board, instrumentalities to maintain the scraper up-raised from the board when the carriage is moving in one direction, said instrumentalities comprising a part associated with the scraper and a part on the carriage movable relative thereto, said parts being interlockingly engageable when the scraper is upraised, and automatic means for releasing engagement of said parts when the carriage reaches a pre-determined point in its movement over the board, said last means comprising a kick-off bar associated with the said part on the carriage, and means for positively maintaining said scraper in engagement with the board when the carriage is moving in an opposite direction, said last means comprising an instrumentality movable relative to the carriage, and means automatically cooperable with said instrumentality to lock the same relative to the scraper when the latter is in dropping board engaging position.

13. In apparatus for cleaning poultry dropping boards, in combination, a carriage, a scraper movable relative to said carriage for engaging and cleaning a dropping board, means for moving the carriage in opposite directions along the surface of the board, instrumentalities to maintain the scraper upraised from the board when moving in one direction, said instrumentalities comprising a part associated with the scraper and a part on the carriage movable relative thereto, said parts having hook portions interlockingly engageable when the scraper is upraised, and means operable upon said instrumentalities for automatically releasing the scraper from effective action of said instrumentalities to permit engagement of the scraper with the board when the scraper reaches a predetermined point in its movement over the board, said last means comprising a kick-off bar associated with said part on the carriage.

14. In apparatus for cleaning poultry dropping boards, in combination, a dropping board, a carriage, a scraper movable relative to said carriage into and out of engagement with a dropping board, means for moving the carriage in opposite directions along the surface of the board, a member movable relative to said carriage and interlockingly engageable with the scraper when the latter is in up-raised position to maintain the same in said position when the carriage is moving in one direction, and means positioned adjacent the end of said board for engaging said member to release the same from engagement with the scraper.

15. In apparatus for cleaning poultry dropping boards, in combination, a carriage, a scraper movable relative to the carriage into and out of engagement with a dropping board, means for moving the carriage in opposite directions along the surface of the board, instrumentalities for maintaining the scraper up-raised from the board when the carriage is moving in one direction, automatic means for releasing the scraper from effective action of said instrumentalities to permit engagement of the scraper with the board when the carriage reaches a predetermined point in its movement over the board, an instrumentality releasable for downward movement by gravity upon release of the scraper from effective action of said instrumentalities, and means automatically engageable with said instrumentality upon downward movement thereof to lock said instrumentality in engagement with said scraper when the latter is in dropping board engaging position and thereby positively maintain the scraper in said latter position.

16. In apparatus for cleaning poultry dropping boards, in combination, a carriage, a scraper pivoted to the carriage for movement into and out of engagement with a dropping board, means for moving the carriage in opposite directions along the surface of the board, a member movable relative to said carriage for engagement with the scraper when the latter is in up-raised position to maintain the scraper in said position, said member being automatically engageable to move the same out of engagement with the scraper when the carriage reaches a predetermined point in its movement over the board to permit the scraper to drop to board engaging position, an instrumentality releasable for downward movement by gravity upon release of the scraper from effective action of said member, and means automatically engageable with said instrumentality upon downward movement thereof to lock said instrumentality in engagement with said scraper when the latter is in dropping board engaging position and thereby positively maintain the scraper in said latter position.

17. In apparatus for cleaning poultry dropping boards, in combination, a carriage, a scraper pivoted to the carriage for movement into and out of engagement with a dropping board, means for moving the carriage in opposite directions along the surface of the board, a member movable relative to said carriage for interlocking engagement with the scraper when the latter is in up-raised position to maintain the scraper in said position, said member being automatically engageable to move the same out of engagement with the scraper when the carriage reaches a predetermined point in its movement over the board to permit the scraper to drop to board engaging position.

THEODORE BRAND.